United States Patent
Taniguchi et al.

(10) Patent No.: US 6,235,421 B1
(45) Date of Patent: *May 22, 2001

(54) ENCLOSED LEAD STORAGE BATTERY

(75) Inventors: Akihiro Taniguchi, Kosai; Gou Kashio, Toyohashi; Akitoshi Hiramatsu, Toyokawa; Takashi Hattori, Toyohashi, all of (JP)

(73) Assignee: Matsushita Electric Industrial Co. Ltd., Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/893,679

(22) Filed: Jul. 11, 1997

(30) Foreign Application Priority Data

Jul. 17, 1996 (JP) .................................................... 8-187158

(51) Int. Cl.$^7$ .......................... H01M 10/16; H01M 10/12
(52) U.S. Cl. ......................... 429/142; 429/176; 429/204; 429/228
(58) Field of Search ..................................... 429/142, 204, 429/228, 129, 225, 176

(56) References Cited

U.S. PATENT DOCUMENTS 4,262,068 * 4/1981 Kono et al. .......................... 429/204
5,468,575 * 11/1995 Holland et al. .................. 429/204 X

FOREIGN PATENT DOCUMENTS 540491 5/1941 (GB) .
WO8101076 4/1981 (WO) .

OTHER PUBLICATIONS

European Search Report dated Jan. 21, 2000.

Patent Abstracts of Japan, vol. 009, No. 225, (E–342), Sep. 11, 1985 & JP 60 081776 A (Matsushita Denki Sangyo KK), May 9, 1985.

Patent Abstracts of Japan, vol. 011, No. 384 (E–565), Dec. 15, 1987 & JP 62 150649 A (Matsushita Electic Ind Co. Ltd.), Jul. 4, 1987.

Patent Abstracts of Japan, vol. 012, No. 337 (E–657), Sep. 12, 1988 & JP 63 102172 A (Japan Storage Battery Co. Ltd.), May 7, 1988.

* cited by examiner

Primary Examiner—John S. Maples
(74) Attorney, Agent, or Firm—Stevens, Davis, Miller & Mosher, L.L.P.

(57) ABSTRACT

An enclosed lead storage battery includes an enclosed container, a group of electrode plates including positive electrode plates and negative electrode plates, and separators, with the group of electrode plates and the separators being housed in the container. The positive electrode plates, negative electrode plates, and separators are layered side by side, with each of the positive electrode plates and negative electrode plates including a top side, a bottom side, and opposite lateral sides. At least one of the positive electrode plates and at least one of the negative electrode plates provide a grid having no frames at opposite lateral sides of the grid, such as an expanded grid. To prevent a short-circuit between the positive and negative electrode plates, the battery includes a porous mat disposed between the container and the opposite lateral sides of the grid.

6 Claims, 3 Drawing Sheets

ENCLOSED LEAD STORAGE BATTERY

BACKGROUND OF THE INVENTION

1. Field of the Invention

The present invention relates to an enclosed lead storage battery which employs, as electrode plates, grids each having no frames at its opposite lateral sides, such as an expanded grid.

2. Description of the Related Art

Generally, a group of electrode plates for use in an enclosed lead storage battery are constructed by layering a positive electrode plate, a separator formed of a water-absorbent glass mat, and a negative electrode plate in sequence side by side, and are then housed in an enclosed container. When an electrolyte is poured into the container housing the group of electrode plates therein, all of the electrolyte is held in the water-absorbent glass mat serving as the separator. Therefore, the electrolyte is hardly present in the container under such a free or liberated condition that the electrolyte is too much in excess of the electrolyte holding ability of the separator. In such an enclosed lead storage battery, oxygen generated from the positive electrode plate in an overcharged state is absorbed by the negative electrode plate, thereby preventing an excessive rise in internal pressure of the storage battery.

In many cases, cast grids each having frames on its opposite lateral sides are employed as grids constituting the positive and negative electrode plates. Also, as stated above, the electrolyte is kept from being present under the free or liberated condition. Therefore, lead is prevented from depositing on the opposite lateral sides of the electrode plate, thereby ensuring the protection against a short-circuit.

Meanwhile, grids each having no frames on its opposite lateral sides (e.g., expanded grids) have often been employed as, particularly, the negative electrode plates in recent years. For an electrode plate employing such an expanded grid which has no frames on its opposite lateral sides, however, there is a fear that the repetition of charging and discharging cycles may cause an active material to swell out of the opposite lateral sides of the negative electrode plate, extend further along the inner wall surfaces of the container beyond the separator, and finally come into contact with the opposite lateral sides of the positive electrode plate, thus giving rise to a short-circuit.

SUMMARY OF THE INVENTION

With the view of solving the above-stated problem in the related art, an object of the present invention is to provide an enclosed lead storage battery wherein grids each having no frames at their opposite lateral sides are employed as electrode plates, while ensuring prevention of a short-circuit between the lateral sides of negative and positive electrodes plates.

To achieve the above object, according to the present invention, the opposite lateral sides of a group of electrode plates comprising positive electrode plates, negative electrode plates and separators layered side by side are covered by a porous mat in the direction in which the electrode plates are layered. The porous mats fills, particularly, spaces between the lateral sides of the negative electrode plates and the adjacent separators. With this construction, an active material swelling at the opposite lateral sides of the negative electrode plates during repeated charging and discharging cycles is prevented by the presence of the porous mat from reaching the opposite lateral sides of the positive electrode plates while bypassing the separators. Thus, an enclosed lead storage battery can be provided in which a short-circuit between the lateral sides of the negative and positive electrode plates is surely avoided.

DESCRIPTION OF THE PREFERRED EMBODIMENTS

Figure 1:
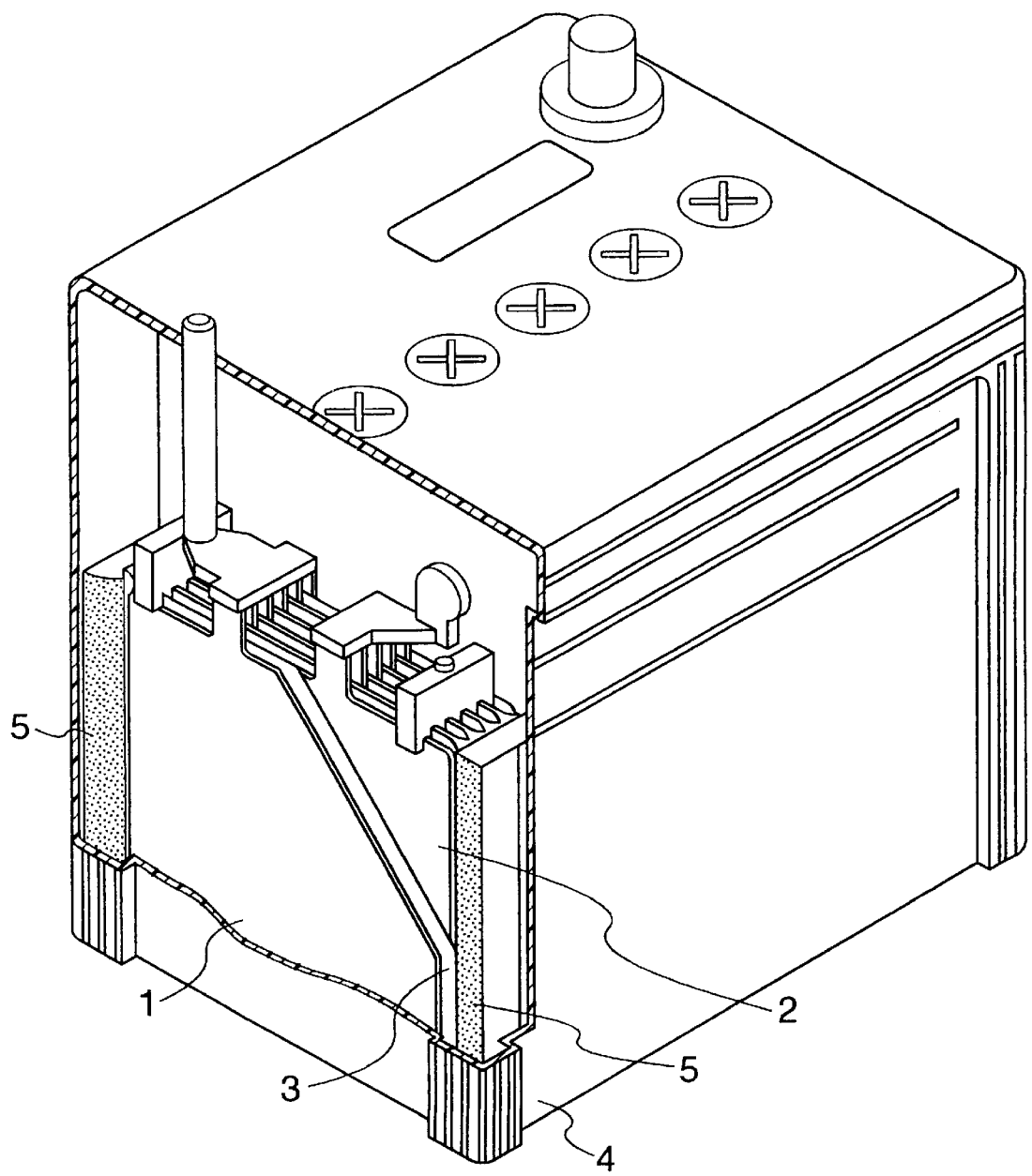
FIG. 1 is a perspective view of an enclosed lead storage battery according to one embodiment of the present invention, the battery being vertically cut into halves.

Preferred embodiments of the present invention will be described hereunder with reference to the drawings. FIG. 1 shows an enclosed lead storage battery according to one embodiment of the present invention, and illustrates the internal structure for only one cell. A positive electrode plate 1 and a negative electrode plate 2 are placed side by side, i.e., layered horizontally, with a separator 3 interposed between both the plates 1, 2. A porous mat 5 is disposed between a group of the electrode plates and a container 4. The positive electrode plate 1 and the negative electrode plate 2 have each a size of 120 mm long and 100 mm wide in the illustrated embodiment.

Figure 2:
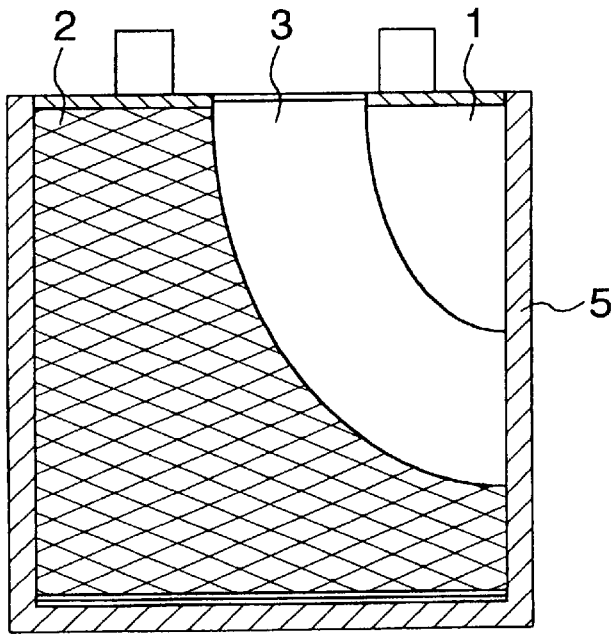
FIG. 2 is a vertical sectional view showing a group of electrode plates and a porous mat which are used in the embodiment shown in FIG. 1.
Figure 3:
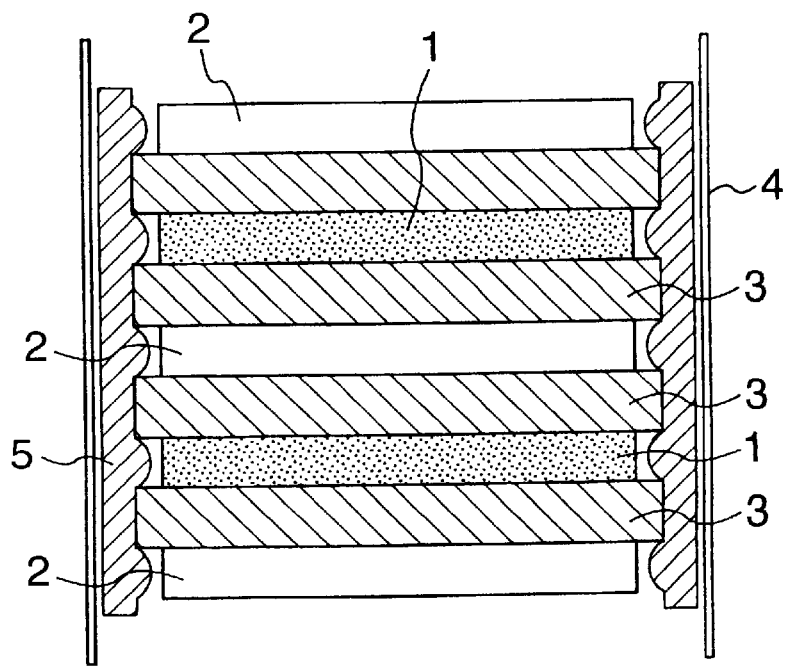
FIG. 3 is a horizontal sectional view showing the group of electrode plates and the porous mat which are used in the embodiment shown in FIG. 1.

FIG. 2 is a vertical sectional view showing a construction of the group of electrode plates and the porous mat 5 in the embodiment shown in FIG. 1, and FIG. 3 is a horizontal sectional view of one of cells structured in the container according to the embodiment. The negative electrode plate 2 employs, as a grid, an expanded grid which has no frames on its opposite lateral sides. The separator 3 is formed of a porous mat which is the same as the porous mat 5 and includes glass fibers as a main component. The porous mat 5 covers the opposite lateral sides and the bottom surface of the group of electrode plates so as to fill spaces between the inner wall surface of the container 4 and the opposite lateral sides of the electrode plates and the separators.

In the illustrated embodiment, the upper sides of the electrode plates are not covered by the porous mat. Note that, aside from the embodiment, the bottom surface of the group of electrode plates is not always required to be covered by the porous mat. The width of the separator 3 is selected such that the separator extends beyond the opposite lateral sides of the electrode plates by 3 mm on each of the left and right sides in the direction of width of the electrode plates. After being inserted in the container 4, the porous mat 5 is held in close contact with the inner wall surface of the container 4. Further, similar advantages can be provided even if the separator 3 is different in material from the porous mat 5.

Figure 5:
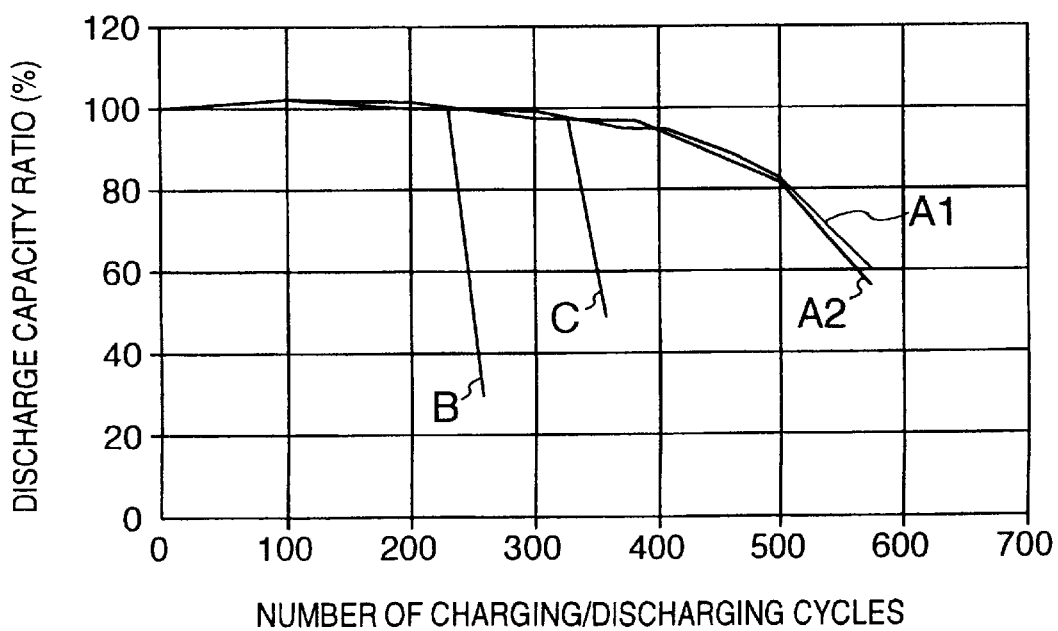
FIG. 5 is a graph showing the relationship between the number of charging/discharging cycles and a discharge capacity ratio.

Practical examples of the present invention will be described below. Enclosed lead storage batteries with voltage of 12 V and rated capacity of 60 Ah were fabricated and subjected to a charging/discharging cycle test. FIG. 5 shows changes in the relationship between the number of charging/discharging cycles and a discharge capacity ratio. Test conditions were as follows. Charging was conducted with a constant current in two stages (Charging was conducted with a current of 12 A up to 14.4 V and then was conducted with a current of 3 A.). Discharging was conducted with a constant current of 20 A until the terminal voltage reduced down to 9.9 V. In FIG. 5, A1 represents the enclosed lead storage battery wherein the porous mat 5 being the same as the separator 3 was employed, and A2 represents the enclosed lead storage battery wherein a porous mat 5' having larger porosity than the separator 3 was employed.

As will be apparent from FIG. 5, conventional lead storage batteries B, C having no porous mats 5 showed an abrupt drop in discharge capacity ratio at about 200 and 300 cycles, respectively, due to a short-circuit caused between the lateral sides of the electrode plates. By contrast, in the batteries A1, A2 fabricated according to the above embodiment, the active material at the opposite lateral sides of the negative electrode plates is prevented by the presence of the porous mat from swelling to such an extent as giving rise to an internal short-circuit. Both the batteries A1, A2 had substantially the same cycle life during which no short-circuit occurred between the lateral sides of the electrode plates.

Figure 4:
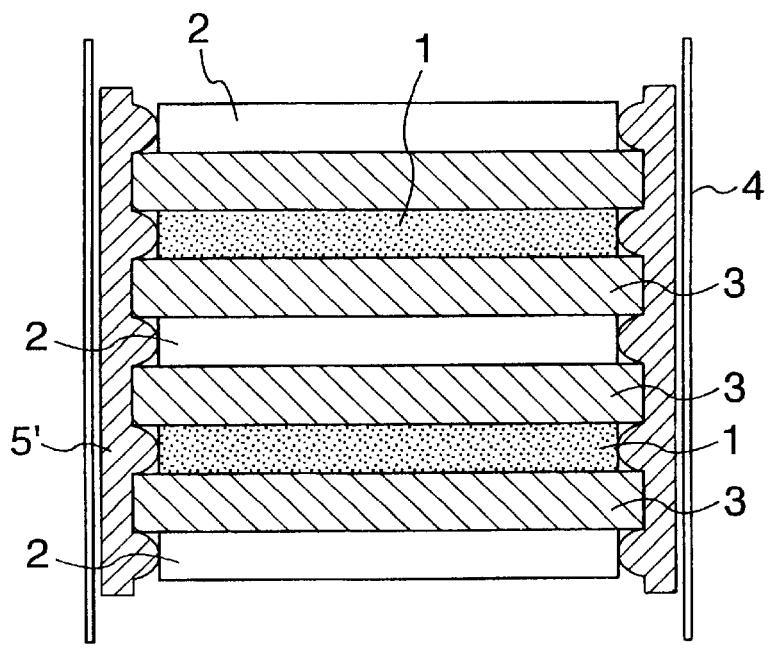
FIG. 4 is a horizontal sectional view showing the group of electrode plates and the porous mat which are used in a modification of the embodiment shown in FIG. 1.

As a result of dismantling the batteries A1, A2 after the end of the cycle life test, however, the space between each of the lateral sides of the electrode plates and the adjacent separator was filled to a greater extent (i.e., the open space was narrowed) by the porous mat in A2 using the porous mat with larger porosity than in A1, as will be seen from FIGS. 3 and 4. If the cycle life is further extended with an improvement in performance of the electrode plates in the future, there is a risk that a short-circuit may occur in A1 between the lateral sides of the electrode plates. Accordingly, it is desired to employ the porous mat 5' having larger porosity as with A2.

As fully described above, according to the present invention, in an enclosed lead storage battery which employs, as electrode plates, grids each having no frames at their opposite lateral sides, at least the opposite lateral sides of a group of the electrode plates are covered by a porous mat to fill spaces between the lateral sides of the electrode plates and adjacent separators. With this construction, a battery can be provided in which, during repeated charging and discharging cycles, an active material at the opposite lateral sides of negative electrode plates is prevented by the presence of the porous side mat from swelling excessively, and a short-circuit between the lateral sides of the negative and positive electrode plates can be surely avoided.

What is claimed is:

1. An enclosed lead storage battery comprising:

an enclosed container, a group of electrode plates comprising positive electrode plates and negative electrode plates, and separators, said group of electrode plates and said separators being housed in said container, said positive electrode plates, said negative electrode plates, and said separators being layered side by side, each of said positive electrode plates and said negative electrode plates comprising a top side, a bottom side, and opposite lateral sides, wherein at least one of said positive electrode plates and at least one of said negative electrode plates provides a grid having no frames at opposite lateral sides of said grid, wherein a porous mat of a single uniform maximum thickness fills a space between said opposite lateral sides of said grid and said container, wherein said porous mat has a height approximately equal to that of said positive electrode plates and said negative electrode plates, and wherein said separators extend beyond the opposite lateral sides of the electrode plates.

2. An enclosed lead storage battery according to claim 1, wherein said separators comprise glass fibers as a main component, and said porous mat has a larger porosity than said separators.

3. An enclosed lead storage battery according to claim 1, wherein said top side of the positive electrode plates and said top side of the negative electrode plates is uncovered by the porous mat.

4. An enclosed lead storage battery according to claim 3, wherein said separators comprise glass fibers as a main component, and said porous mat has a larger porosity than said separators.

5. An enclosed lead storage battery according to claim 1, said porous mat further comprising a portion covering said bottom side of the positive electrode plates and said bottom side of the negative electrode plates, and wherein said top side of the positive electrode plates and said top side of the negative electrode plates is uncovered by the porous mat.

6. An enclosed lead storage battery according to claim 5, wherein said separators comprise glass fibers as a main component, and said porous mat has a larger porosity than said separators.

* * * * *